(No Model.)
G. GILLPATRICK.
ANIMAL EXTERMINATOR.
No. 473,872. Patented Apr. 26, 1892.
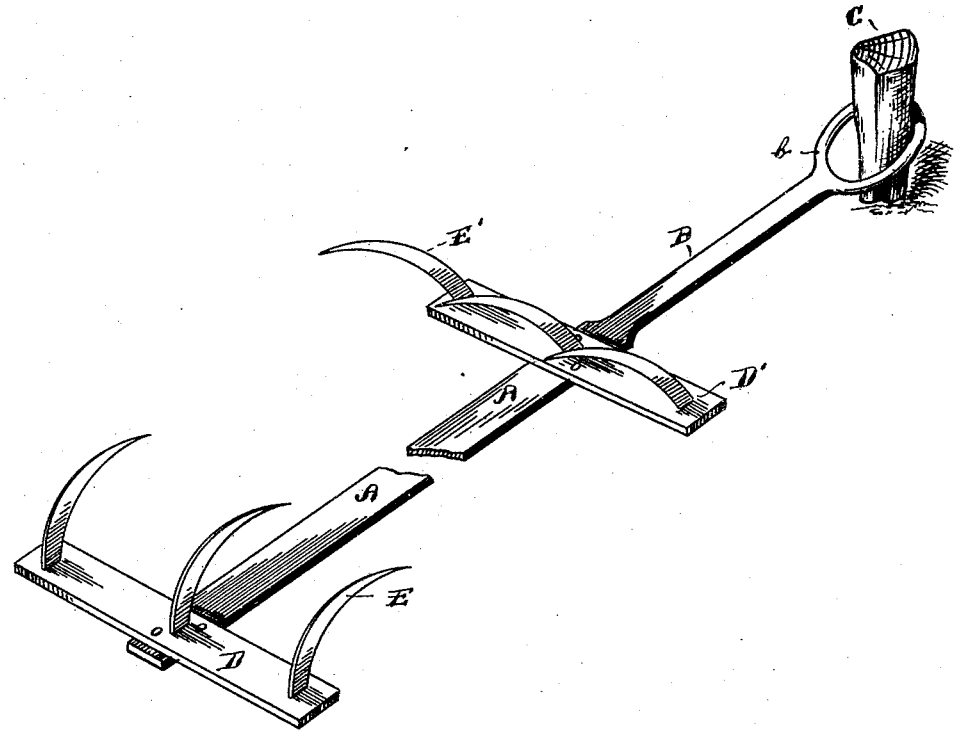
Witnesses.
Inventor.
George Gillpatrick
By N. A. Acker
Atty.

UNITED STATES PATENT OFFICE.

GEORGE GILLPATRICK, OF MARTINEZ, ASSIGNOR OF ONE-HALF TO GEORGE W. ELLIS, OF OAKLAND, CALIFORNIA.

ANIMAL-EXTERMINATOR.

SPECIFICATION forming part of Letters Patent No. 473,872, dated April 26, 1892.

Application filed December 14, 1891. Serial No. 414,941. (No model.)

*To all whom it may concern:*

Be it known that I, GEORGE GILLPATRICK, a citizen of the United States, residing at Martinez, in the county of Contra Costa and State of California, have invented certain new and useful Improvements in Animal-Exterminators; and I do hereby declare the following to be a full, clear, and exact description of said invention, such as will enable others skilled in the art to which it most nearly appertains to make, use, and practice the same.

My invention has relation to certain new and useful improvements in a device which I term an "animal-exterminator," which consists in the arrangement of parts and details of construction, as will be more fully set forth in the drawing, described, and pointed out in the specification.

It is a well-known fact that one of the greatest annoyances which the farmer has to contend with results from damage to the grain-fields, orchards, and vineyards, caused by field-rats, moles, gophers, squirrels, and rabbits, which burrow beneath the soil and eat or destroy the grain planted therein, which loss amounts to thousands of dollars per year and in many cases completely destroy the entire yearly crop. Many devices have been employed to kill or trap the destroying pest, but the same have always proved too expensive or complicated for use, until as a last resort the farmer has been compelled to adopt the use of poison, which is laid or sprinkled around the burrow made by the animal; but while this has been found effective in many cases it is, however, disastrous to farm-cattle, which unknowingly feed upon pastures containing poison. Consequently the farmer is compelled to either submit to the destruction of grain by these animals or take chances as to the safety of his cattle.

The object of my invention is to provide a simple and effectual device which shall cause the death of such animals by causing same to be disemboweled in their efforts to run in or out of the ground-holes, thus assuring their death, and at the same time overcoming the danger attendant on the use of poison for this purpose, and at the same time one which shall be simple of operation, less expensive, and more durable than any device for a similar purpose heretofore known to me.

Referring to the drawing forming a part of this specification, in which similar letters of reference are used to denote corresponding parts throughout the entire specification, the letter A is used to indicate the supporting-rod of my device, which by preference I construct of thin rod-iron of such ductility as to permit of same being easily bent, as desired, although the supporting-rod may be made of any suitable material. The upper end or handle B is constructed of less material in order to add greater flexibility thereto and terminates in an open loop *b*, through which a peg C may be driven in order to hold same firmly to the ground, so as to prevent displacement when force is exerted thereon. If so desired, the handle may be made separate from rod A and secured thereto in any well-known manner. Upon the supporting-rod A, I bolt or otherwise secure cross-pieces D D' near the top and bottom, as shown in the drawing. To these cross-pieces I fasten a series of upwardly-inclined knives or blades E E', which knives are fastened to the cross-pieces in any suitable manner. By increasing the width of the supporting or connecting rod A the cross-pieces may be dispensed with and upwardly-projecting knives secured directly thereto. By preference I secure the knives in series of three; but more or less may be employed. However, I prefer to secure the blades to the cross-pieces instead of directly to the supporting-rod; but it is obvious that the two cross-pieces may be connected together by means of wire.

My device is used in the following manner: The supporting-rod or connecting-strap, with the knives attached thereto, is run or placed into the hole or burrow formed by the animal and is firmly secured in place by means of peg C, which passes through loop *b* of handle B and is driven firmly into the ground. Inasmuch as the knives or blades run at such an incline, as shown, it is obvious that the hole or burrow is not entirely filled. Consequently as the mole, squirrel, rat, rabbit, &c., endeavors to run in or out he contacts with the back of the blades or knives; but inasmuch as they are dull his progress is not stopped. Consequently as the forward movement is continued the body gradually from the weight thereof bears upon the point of the knives. If the weight of the body causes the point of the knives to penetrate the skin, the pain thereof will cause the animal to move backward, when from the slope the blades will cut into the body and cause the disemboweling of the animal, which if not immediately causing his death will do so shortly thereafter. Should the animal, however, succeed in passing one set of knives, it will be impossible to pass the other, inasmuch as the cutting-edge of the knives is met with. Consequently he is then imprisoned between the upper and lower series of knives, and as he forces his way in or out is completely disemboweled. By means of the peg-fastening it is impossible to move the device from its place within the hole. By placing or locating this device in a number of holes the animals will be shortly exterminated.

Having thus described my invention, what I claim as new, and desire to secure by Letters Patent, is—

1. An exterminator for ground-animals, consisting of a supporting strap or rod having a series of cutting knives or blades secured thereto and projecting upwardly, said rod or strap being adapted to be secured within the animal's burrow, as and for the purpose set forth.

2. The combination, with a flexible strap, of the knife-plate fastened thereto and of the knives projecting therefrom, said strap and knives being adapted to be secured within the animal's burrow, as and for the purpose set forth.

3. The combination, with the flexible supporting-strap, of a handle provided with a ground-fastener, knife-plates secured near the top and bottom of the strap, and the cutting-blades arranged thereon, as and for the purpose set forth.

4. In an animal-exterminator, the combination, with the knife-plate, of knives arranged thereon and projecting upwardly therefrom, and means of securing the plate and knives within the animal's burrow, as and for the purpose set forth.

In testimony whereof I affix my signature in presence of two witnesses.

GEORGE GILLPATRICK.

Witnesses:
R. H. LATIMER,
W. C. GERRISH.